S. F. VOSE & C. R. HARRYMAN.
PLOW.
APPLICATION FILED MAY 5, 1908.
901,220.
Patented Oct. 13. 1908.
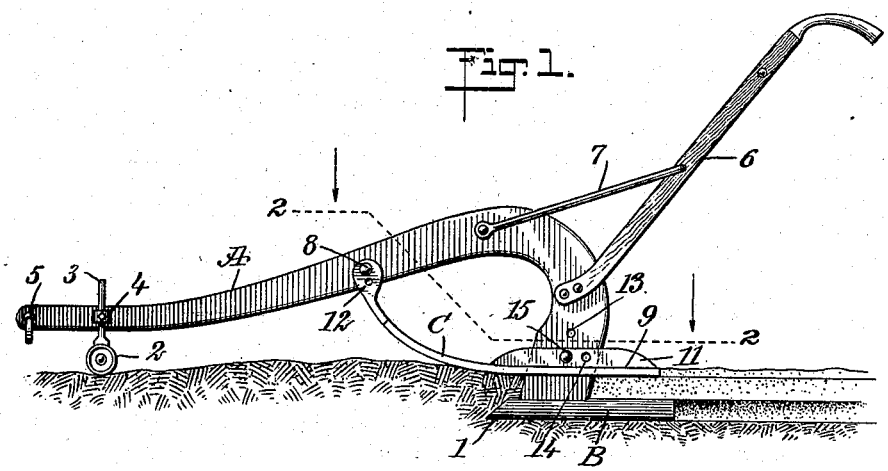
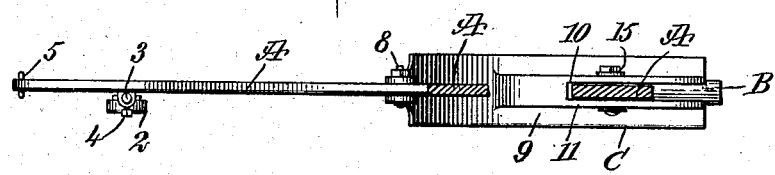
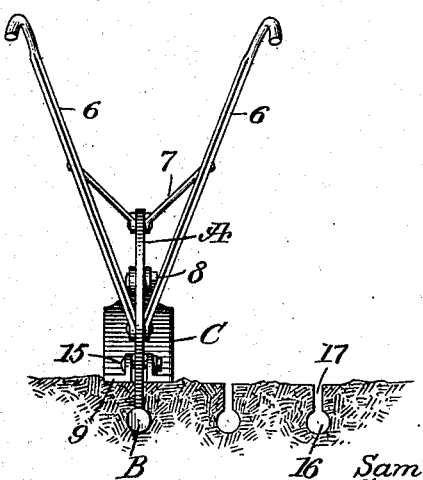
WITNESSES
INVENTORS
Samuel F. Vose
Carrel R. Harryman
BY
ATTORNEYS

UNITED STATES PATENT OFFICE.

SAMUEL F. VOSE AND CARREL R. HARRYMAN, OF SHAWNEE, OKLAHOMA.

PLOW.

No. 901,220.　　　　Specification of Letters Patent.　　　　Patented Oct. 13, 1908.

Application filed May 5, 1908. Serial No. 430,893.

*To all whom it may concern:*

Be it known that we, SAMUEL F. VOSE and CARREL R. HARRYMAN, citizens of the United States, and residents of Shawnee, in the county of Pottawatomie and State of Oklahoma, have invented certain Improvements in Plows, of which the following is a full, clear, and exact description.

The invention relates to certain improvements in devices for opening up the ground below a furrow, for the purpose of retaining moisture, preventing an excess of moisture, and in times of drought providing for a circulation of air beneath the roots of the plants, whereby, under such conditions, any moisture in the atmosphere is drawn downward and held in such a proximity to the roots as to promote the growth of the plants.

It is a further purpose of the invention to provide a simple agricultural device in the nature of an irrigating plow, that can be made to follow a furrow opening plow of any type, and form a conduit below the furrow that is in communication with the outside atmosphere, and which, after a fairly good rainfall, will store sufficient water to insure the roots of the plants being kept moist under almost all conditions.

The invention also contemplates certain novel features of the construction and combination of the several parts of the improved irrigating plow, whereby certain important advantages are obtained, and the device is rendered simpler, less expensive, and otherwise better adapted, and more convenient for use than others of the same character in my knowledge, all of which points will be hereinafter fully set forth.

The novel features of the invention will be carefully defined in the claims:

In the accompanying drawings that serve to illustrate our invention, we have shown an irrigating plow in which the share adapted to produce the conduit above referred to, is of peculiar construction, and means for regulating the depth at which the share is placed beneath the ground, together with means for preventing the loose earth entering the conduit during the operation of the plow; but although the improved irrigating plow is preferably constructed as presented, we desire to be understood that we do not limit ourselves to the special construction or the particular arrangement of the share, relatively to the beam, since modifications can be made in these directions with good results.

Reference is to be had to the accompanying drawings forming a part of this specification, in which similar characters of reference indicate corresponding parts in all the views.

Figure 1 is a side elevation of the improved device; Fig. 2 is a sectional plan taken on the line 2—2 of Fig. 1, and Fig. 3 is a rear elevation of the improved plow.

A represents the plow beam, which may be of any approved formation, but is generally of the customary shape, and at the heel or bottom portion of the beam A, the share B is located. This share is a sub-soil share, being adapted to travel entirely below the surface of the ground, and to produce a conduit beneath a furrow, or at any other desired point. This share B may be given any desired cross-sectional shape, and may be of any desired length, but preferably the said share B is circular in cross-section, so as to offer the least possible resistance to its passage through the earth. The said share B extends both forward and rearward under the heel or the lower end of the beam A, as is clearly shown in Fig. 1, and its forward end is inclined downwardly and forwardly, so as to produce a cutting surface 1.

At the forward end of the beam A a supporting wheel 2 is located, adapted to travel upon the surface of the ground, as is clearly illustrated in Fig. 1, and this wheel 2 is provided with a shank 3 that passes through a suitable guide on the beam A, being held in adjusted position relatively to the beam, by means of a set screw 4, or the equivalent of the same. The beam A is provided with any approved form of clevis 5. Handles 6 of any approved form are attached to the rear portion of the beam A, and are provided with suitable braces 7, as is shown in Figs. 1 and 3.

In connection with the beam A and the share B we employ a shield C. This shield is by preference constructed of a flat piece of metal cast or forged, and is inclined at its forward end in a downward and rearward direction, the rear portion 9 of the said shield being flat or horizontal, and the upper forward portion of the said shield is adjustably attached to the said beam A by means of a suitable pivot pin 8, removable from the said beam and the said shield. The forward upper end of the shield C is made to straddle the lower portion of the beam A, at a point between the forward and the rear portions of said beam, and the shield C is also made to straddle the lower or heel portion of the said beam A, as is shown best in Fig. 2, being provided to that end with a suitable slot 10 that receives the heel portion of the beam. The said shield C at its lower rear portion is provided with flanges 11 that surround said slot 10, except at its rear end portion. The forward upper end of the shield C is provided with a series of openings 12, through any one of which the aforesaid pivot pin 8 is passed, rendering that portion of the shield adjustable, and the heel portion of the said beam is provided with apertures 13, and the flanges 11 of the shield are provided also with apertures 14, a pivot or cotter pin being passed through registering apertures 13 and 14, thus permitting the adjustment of the shield C relatively to the surface of the ground, as is shown in Fig. 1.

In the operation of this device, the share B produces a conduit 16 shown best in Fig. 3, and the heel portion of the beam A establishes a communication between the outside atmosphere and the said conduit, by producing a continuous channel 17, as is also best shown in Fig. 3, and at such time, the shield C traveling on the surface of the ground prevents loose earth from entering the said conduit. The adjustment of the said shield relatively to the said share, regulates the depth at which the share is to travel in the ground.

The device constructed as above described, is exceedingly simple, economic and well adapted for the purpose intended, and the share B will so pack the earth in producing the conduit, as to prevent the walls thereof being washed away. It is obvious, that in the event of a severe rainfall, the water will be retained in the conduit beneath and away from the roots of the plants above it, and therefore the roots of the plants will not be rotted, and during a drought, for example, the water stored in the conduit will be gradually supplied to the roots of the plants, facilitating their growth, and should the supply of water in a conduit be entirely exhausted, the passage of air through the conduit will tend to draw any moisture that may be in the air into said conduit.

What we claim as new and desire to secure by Letters Patent is:

1. In an irrigating plow, or a plow for similar purposes, a beam, a share carried by said beam adapted as a sub-soil share, producing in operation a conduit in the ground, and a shield adapted for engagement with the surface of the ground, and said shield having an upwardly curved forward end pivoted to the beam and provided with a slotted rear end to receive the heel of the beam and to which it is secured.

2. An irrigating plow, comprising a beam, a draft device therefor, means for supporting the forward portion of the beam, a share in the form of a cylinder secured to the heel portion of the beam, adapted to travel wholly below the surface of the ground, which share is provided with a forward cutting surface, and a shield adjustably pivoted to the said beam and adjustably secured to the heel thereof, which shield is adapted to engage with the surface of the ground over the said share, and is likewise adapted to straddle the said beam.

3. A plow shield, comprising a body having an upwardly curved and forked forward end, the members of which are apertured and provided with a longitudinal slot at its rear end and with upwardly projecting and apertured flanges at the sides of the slot.

In testimony whereof we have signed our names to this specification in the presence of two subscribing witnesses.

SAMUEL F. VOSE.
CARREL R. HARRYMAN.

Witnesses:
FRANK W. BOGGS,
CHAS. E. WELLS.